(12) United States Patent
Kumar et al.

(10) Patent No.: US 12,360,932 B2
(45) Date of Patent: Jul. 15, 2025

(54) COORDINATE ROTATION DIGITAL COMPUTER USING DIRECT MEMORY ACCESS ENGINES

(71) Applicant: Cypress Semiconductor Corporation, San Jose, CA (US)

(72) Inventors: Sanjeev Kumar, Bangalore (IN); Rachana Mahadevappa, Mysore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 41 days.

(21) Appl. No.: 18/530,673

(22) Filed: Dec. 6, 2023

(65) Prior Publication Data
US 2025/0190383 A1 Jun. 12, 2025

(51) Int. Cl.
*G06F 13/28* (2006.01)
*G06F 13/30* (2006.01)
(52) U.S. Cl.
CPC .............. *G06F 13/30* (2013.01); *G06F 13/28* (2013.01)

(58) Field of Classification Search
None
See application file for complete search history.

(56) References Cited

U.S. PATENT DOCUMENTS 11,354,257 B2 * 6/2022 Borgonovo ......... G06F 13/1668
2021/0342277 A1 * 11/2021 Borgonovo ............ G06F 7/523

\* cited by examiner

*Primary Examiner* — Michael Sun

(57) ABSTRACT

A device includes a Coordinate Rotation Digital Computer (CORDIC), a memory, a first Direct Memory Access (DMA) engine, and a second DMA engine. The memory stores an array of calculation data sets and an array of result data sets corresponding to the calculation data sets. The first DMA engine copies each data set of the array of calculation data sets from the memory to the CORDIC. The second DMA engine copies each result data set of the array of result data sets from the CORDIC to the memory and generates a trigger in response to copying a final result data set of the array of result data sets to the memory.

20 Claims, 6 Drawing Sheets

← 204

CORDIC REGISTER SPACE

| Offset | Qty | Width | Name |
|---|---|---|---|
| 0x8 | 1 | 32 | ID | ~302
| 0x10 | 1 | 32 | INTR | ~304
| 0x14 | 1 | 32 | INTR_SET | ~306
| 0x18 | 1 | 32 | INTR_MASK | ~308
| 0x1C | 1 | 32 | INTR_MASKED | ~310
| 0x40 | 1 | 32 | KEEP | ~312
| 0x44 | 1 | 32 | CON | ~314
| 0x48 | 1 | 32 | CORDX | ~316
| 0x4C | 1 | 32 | CORDY | ~318
| 0x50 | 1 | 32 | CORDZ | ~320
| 0x54 | 1 | 32 | CORRX | ~322
| 0x58 | 1 | 32 | CORRY | ~324
| 0x5C | 1 | 32 | CORRZ | ~326
| 0x60 | 1 | 32 | STAT | ~328
| 0x64 | 1 | 32 | START_CMD | ~330

FIG. 3

COORDINATE ROTATION DIGITAL COMPUTER USING DIRECT MEMORY ACCESS ENGINES

BACKGROUND

A Coordinate Rotation Digital Computer (CORDIC) computes trigonometric functions by iterative complex rotations. All the computations can be done with addition, subtraction, and binary shifts. Many industrial applications, such as motor or power control applications, that use lengthy trigonometric calculations may benefit from combining a CORDIC with a Central Processing Unit (CPU). CORDICs typically execute one CORDIC calculation at a time with CPU involvement, which results in continuous CPU loading at each step, is inefficient, and slows down overall execution time.

For these and other reasons, a need exists for the present invention.

SUMMARY

Some examples of the present disclosure relate to a device. The device includes a Coordinate Rotation Digital Computer (CORDIC), a memory, a first Direct Memory Access (DMA) engine, and a second DMA engine. The memory is to store an array of calculation data sets and an array of result data sets corresponding to the calculation data sets. The first DMA engine is to copy each data set of the array of calculation data sets from the memory to the CORDIC. The second DMA engine is to copy each result data set of the array of result data sets from the CORDIC to the memory and to generate a trigger in response to copying a final result data set of the array of result data sets to the memory.

Other examples of the present disclosure relate to a device. The device includes a Coordinate Rotation Digital Computer (CORDIC), a memory, and a Central Processing Unit (CPU). The CPU is configured to perform a plurality of calculations on the CORDIC to provide a corresponding plurality of result data sets by: loading a first calculation data set for the plurality of calculations into the CORDIC; loading remaining calculation data sets for the plurality of calculations into the memory; setting up a first Direct Memory Access (DMA) engine to copy each calculation data set from the memory to the CORDIC and a second DMA engine to copy each result data set from the CORDIC to the memory; and receiving a trigger from the second DMA engine in response to the second DMA engine copying a final result data set for the plurality of calculations from the CORDIC to the memory.

Yet other examples of the present disclosure relate to a method. The method includes loading, via a Central Processing Unit (CPU), a first calculation data set of a plurality of calculation data sets into a Coordinate Rotation Digital Computer (CORDIC). The method includes loading, via the CPU, remaining calculation data sets of the plurality of calculation data sets into a memory. The method includes in response to loading the first calculation data set into the CORDIC, receiving at a first Direct Memory Access (DMA) engine from the CORDIC, a first start calculation trigger and performing, via the CORDIC, a first calculation based on the first calculation data set. The method includes in response to the first start calculation trigger, copying, via the first DMA engine, a second calculation data set of the plurality of calculation data sets from the memory to the CORDIC. The method includes in response to completing the first calculation based on the first calculation data set, receiving at a second DMA engine from the CORDIC, a first end calculation trigger. The method includes in response to the first end calculation trigger, copying, via the second DMA engine, a first result data set corresponding to the first calculation data set from the CORDIC to the memory.

BRIEF DESCRIPTION OF THE DRAWINGS

FIG. 3 is a table illustrating one example of a CORDIC register space.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1A:
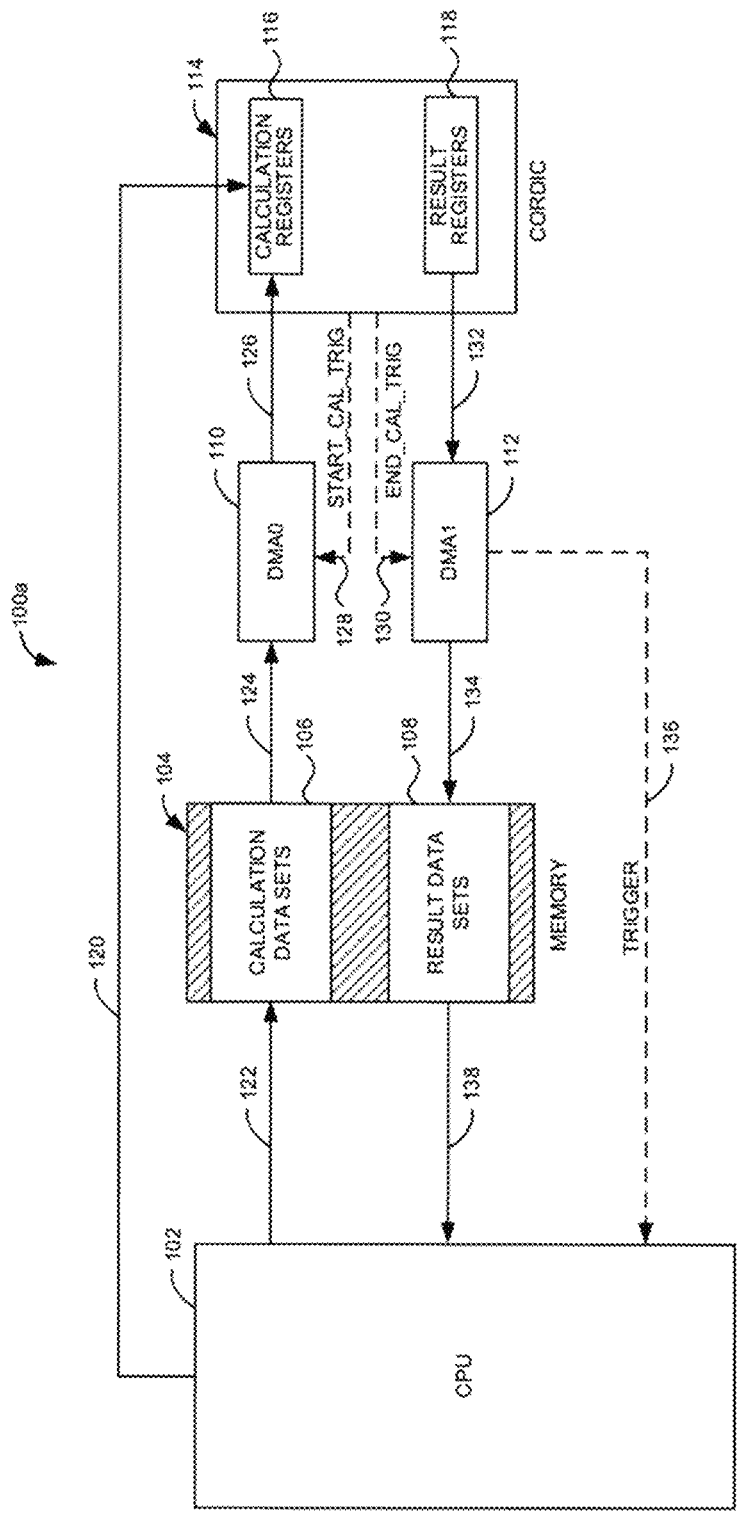
FIG. 1A is a block diagram illustrating one example of a device for executing a plurality of calculations on a Coordinate Rotation Digital Computer (CORDIC).

FIG. 1A is a block diagram illustrating one example of a device 100a for executing a plurality of calculations on a Coordinate Rotation Digital Computer (CORDIC). Device 100a includes a Central Processing Unit (CPU) 102, a memory 104 (e.g., Static Random Access Memory (SRAM)), a first Direct Memory Access (DMA) engine 110 (DMA0), a second DMA engine 112 (DMA1), and a CORDIC 114. CPU 102 controls the operation of device 100a including executing a plurality of calculations on the CORDIC 114. During the execution of a plurality of calculations on the CORDIC 114, the memory 104 stores an array of calculation data sets 106 received from the CPU 102 and an array of result data sets 108 corresponding to the calculation data sets 106 received from the CORDIC 114. The first DMA engine 110 copies each data set of the array of calculation data sets 106 from the memory 104 to the CORDIC 114. The second DMA engine 112 copies each result data set of the array of result data sets from the CORDIC 114 to the memory 104. The second DMA engine also generates a trigger on trigger signal path 136 in response to copying a final result data set (e.g., based on transferring an expected number of bytes) of the array of result data sets to the memory 104.

The CORDIC 114 performs calculations based on calculation data sets written to calculation registers 116 by the first DMA engine 110 to compute corresponding result data sets, which are written to result registers 118. The second DMA engine 112 copies the result data sets from the result registers 118 to the memory 108. The CORDIC 114 includes a start calculation trigger (START_CAL_TRIG) on a signal path 128 connected to the first DMA engine 110 to initiate copying of a next calculation data set of the array of calculation data sets 106 from the memory 104 to the CORDIC 114 (e.g. to calculation registers 116). The CORDIC 114 also includes an end calculation trigger (END_CAL_TRIG) on a signal path 130 connected to the second DMA engine 112 to initiate copying of a current result data set of the array of result data sets from the CORDIC 114 (e.g., from result registers 118) to the memory 104. As described in more detail below with reference to FIG. 3, the CORDIC 114 includes a register space including four input registers (e.g., calculation registers 116) including addresses in ascending order to input a calculation data set to the CORDIC 114. The register space of the CORDIC 114 further includes three output registers (e.g., result registers 118) including addresses in ascending order to output a result data set from the CORDIC 114.

In some examples, the CPU 102 is configured to perform a plurality of calculations on the CORDIC 114 to provide a corresponding plurality of result data sets. The CPU 102 may load a first calculation data set for the plurality of calculations into the CORDIC 114 through a data path 120. The CPU 102 may load the remaining calculation data sets 106 for the plurality of calculations into the memory 104 through a data path 122. The CPU 102 may set up the first DMA engine 110 to copy each calculation data set from the memory 104 to the CORDIC 114 through data paths 124 and 126. The CPU 102 may set up the second DMA engine 112 to copy each result data set from the CORDIC 114 to the memory 104 through data paths 132 and 134. The CPU 102 may receive a trigger through a trigger signal path 136 in response to the second DMA engine 112 copying a final result data set for the plurality of calculations from the CORDIC 114 to the memory 104. In response to the trigger, the CPU 102 may process the results through a data path 138.

The CPU 102 may perform other operations while the CORDIC 114 is performing the plurality of calculations. Accordingly, by using the DMA engines 110 and 112 for copying the next calculation data set to the CORDIC and copying back results from the CORDIC in a chained manner, the CPU bandwidth is freed up and execution speed is increased since there is no CPU involvement while the plurality of calculations are executed by the CORDIC.

Figure 1B:
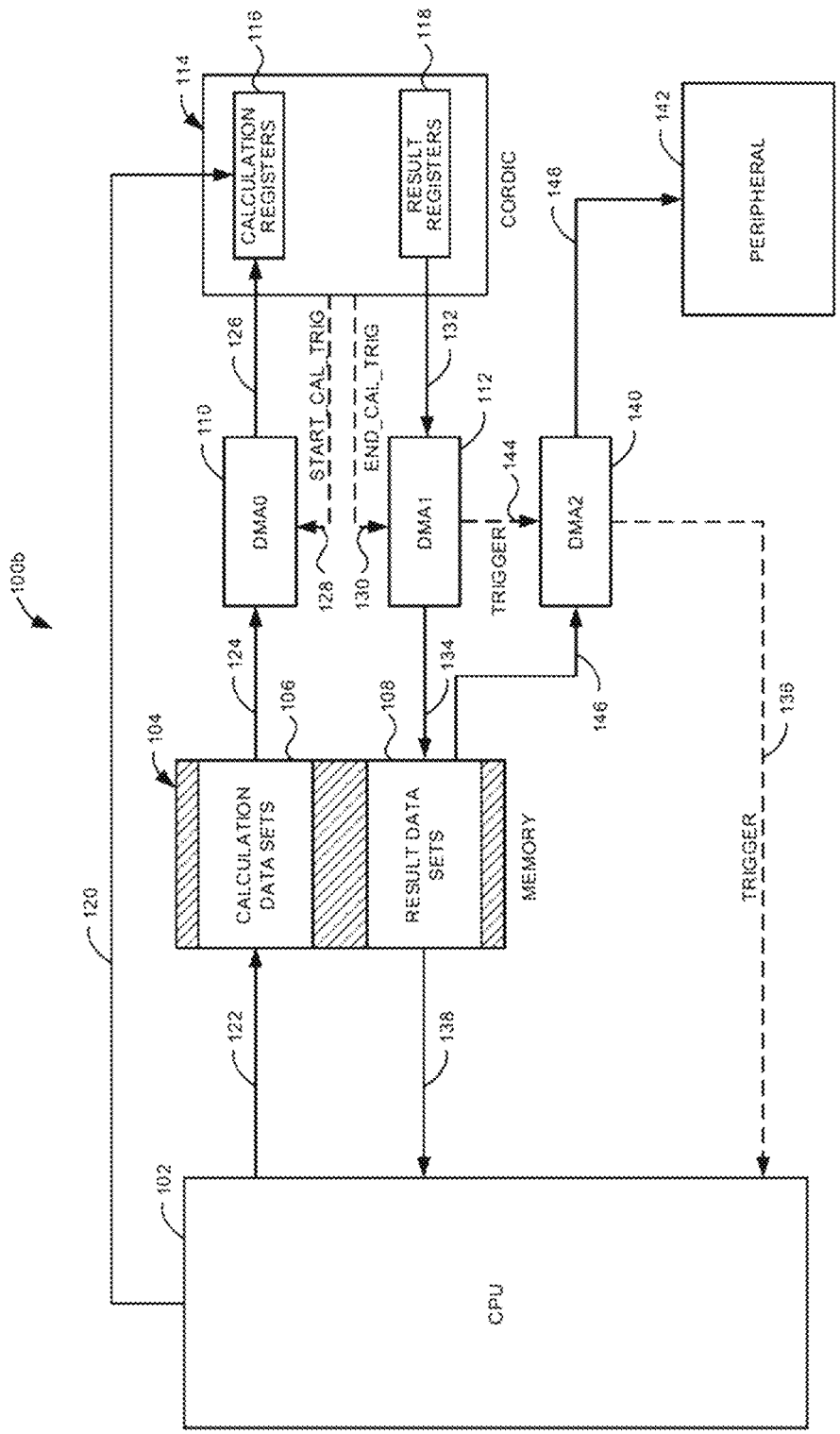
FIG. 1B is a block diagram illustrating another example of a device for executing a plurality of calculations on a CORDIC.

FIG. 1B is a block diagram illustrating another example of a device 100b for executing a plurality of calculations on a CORDIC. Device 100b is similar to device 100a, except that the device 100b further includes a third DMA engine 140 (DMA2) and a peripheral 142 (e.g., I2C, Serial Peripheral Interface (SPI), Universal Asynchronous Receiver/Transmitter (UART)) in addition to the CPU 102, the memory 104, the first DMA engine 110, the second DMA engine 112, and the CORDIC 114. The third DMA engine 140 copies each result data set of the array of result data sets 108 from the memory 104 to the peripheral 142 through data paths 146 and 148. The third DMA engine 140 also generates a trigger on trigger signal path 136 in response to copying a final result data set (e.g., based on transferring an expected number of bytes) of the array of result data sets 108 to the peripheral 142.

In some examples, the CPU 102 is configured to perform a plurality of calculations on the CORDIC 114 to provide a corresponding plurality of result data sets. The CPU 102 may load a first calculation data set for the plurality of calculations into the CORDIC 114 through the data path 120. The CPU 102 may load the remaining calculation data sets 106 for the plurality of calculations into the memory 104 through the data path 122. The CPU 102 may set up the first DMA engine 110 to copy each calculation data set from the memory 104 to the CORDIC 114 (e.g., to calculation registers 116) through the data paths 124 and 126. The CPU 102 may set up the second DMA engine 112 to copy each result data set from the CORDIC 114 (e.g., from result registers 118) to the memory 104 through the data paths 132 and 134. The CPU 102 may set up the third DMA engine 140 to copy each result data set from the memory 104 to the peripheral 142 through data paths 146 and 148. The second DMA engine 112 may trigger the third DMA engine 140 through a trigger signal path 144 in response to the second DMA engine 112 copying a final result data set (e.g., based on transferring an expected number of bytes) for the plurality of calculations from the CORDIC 114 to the memory 104. In response to the trigger from the second DMA engine 112, the third DMA engine 140 copies each result data set from the memory 104 to the peripheral 142. The CPU may receive a trigger through a trigger signal path 136 in response to the third DMA engine 140 copying a final result data set for the plurality of calculations from the memory 104 to the peripheral 142. In response to the trigger, the CPU may process the results through the data path 138.

The CPU 102 may perform other operations while the CORDIC 114 is performing the plurality of calculations. Accordingly, by using the DMA engines 110, 112, and 140 for copying the next calculation data set to the CORDIC, copying back results from the CORDIC, and copying results to the peripheral 142 in a chained manner, the CPU bandwidth is freed up and execution speed is increased since there is no CPU involvement while the plurality of calculations are executed by the CORDIC and while the results are copied to the peripheral.

Figure 2:
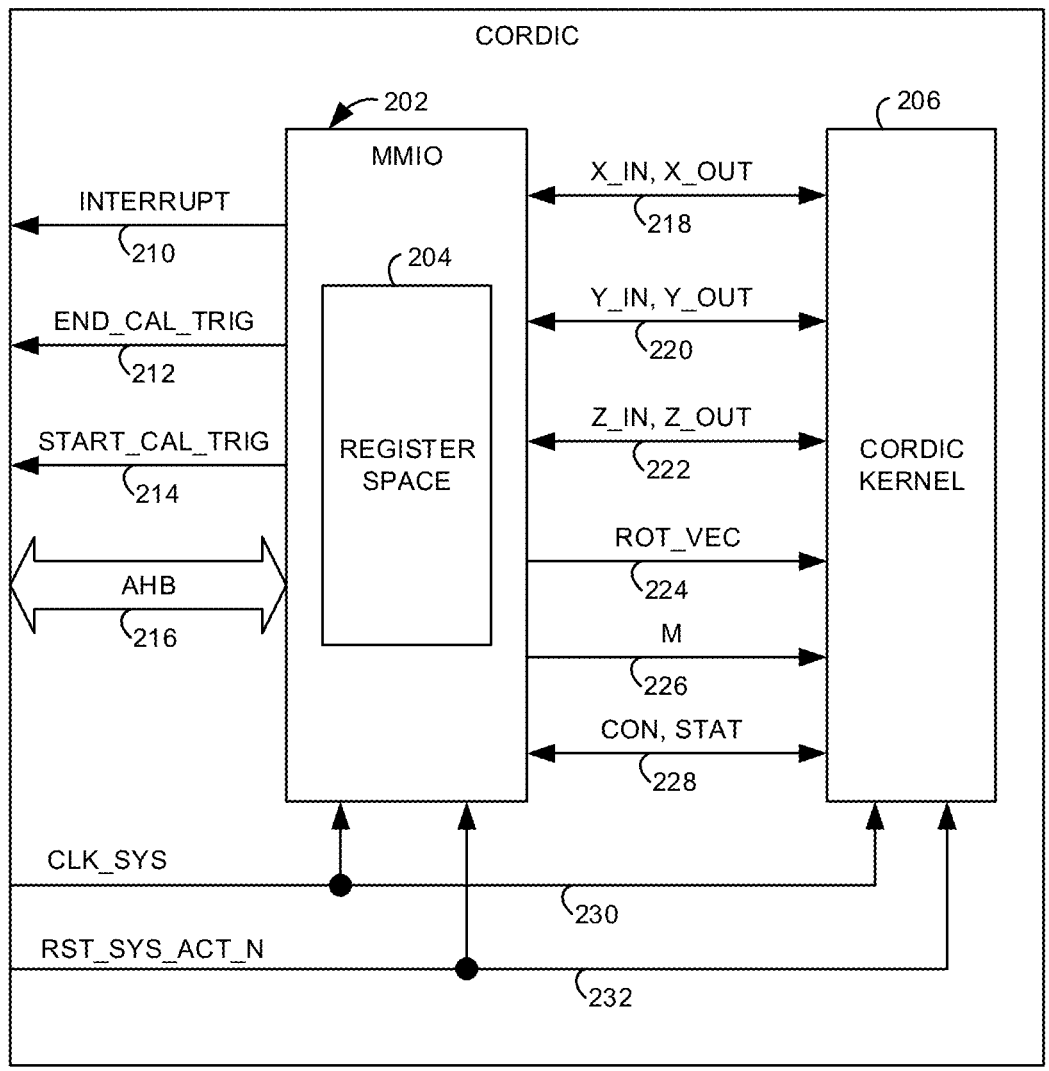
FIG. 2 is a block diagram illustrating one example of a CORDIC.

FIG. 2 is a block diagram illustrating one example of a CORDIC 114. The CORDIC 114 includes Memory-Mapped Input/Output (MMIO) 202 and a CORDIC kernel 206. The CORDIC 114 may include an interrupt output signal path 210, an end calculation trigger (END_CAL_TRIG) signal path 212, a start calculation trigger (START_CAL_TRIG) signal path 214, and an Advanced High-performance Bus (AHB) 216 connected between the MMIO 202 and inputs and/or outputs of the CORDIC 114. The CORDIC 114 includes an X parameter input and output (X_IN, X_OUT) signal path 218, a Y parameter input and output (Y_IN, Y_OUT) signal path 220, a Z parameter input and output (Z_IN, Z_OUT) signal path 222, a rotation/vectoring mode selection (ROT_VEC) signal path 224, an operating mode (linear/circular/hyperbolic) selector (M) signal path 226, and a control and status (CON, STAT) signal path 228 connected between the MMIO 202 and the CORDIC kernel 206. The CORDIC 114 may further include a clock system (CLK_SYS) input signal path 230 and an asynchronous reset (RST_SYS_ACT_N) input signal path 232 connected to the MMIO 202 and the CORDIC kernel 206.

The interrupt signal path 210 may be connected to the CPU 102 (FIGS. 1A and 1B) for the CORDIC 114 to interrupt the CPU. The end calculation trigger signal path 212 may be connected to the end calculation trigger signal path 130 (FIGS. 1A and 1B) for triggering the second DMA engine 112 to copy a current result data set from the CORDIC 114 to the memory 104. The start calculation trigger signal path 214 may be connected to the start calculation trigger signal path 128 (FIGS. 1A and 1B) for triggering the first DMA engine 110 to transfer the next calculation data set to the CORDIC 114. The AHB bus 216 may be used to transfer calculation data sets, result data sets, control information, and status information between the CORDIC 114 and other components (e.g., CPU 102, first DMA engine 110, and/or second DMA engine 112). The clock system input signal path 230 may be used to input a clock signal to the MMIO 202 and the CORDIC kernel 206 for operating the MMIO 202 and the CORDIC kernel 206. The asynchronous reset input signal path 232 may be used to receive a reset signal to asynchronously reset the CORDIC 114.

MMIO 202 includes a register space 204 (which may include calculation registers 116 and result registers 118 of FIGS. 1A and 1B), which is further described below with reference to FIG. 3, for temporarily storing calculation data sets and control information input to CORDIC 114 prior to being transferred to CORDIC kernel 206 and for temporarily storing result data sets and status information from CORDIC kernel 206 prior to being transferred out of CORDIC 114.

Each calculation data set may include an X parameter (X_IN), a Y parameter (Y_IN), and a Z parameter (Z_IN) that are input to register space 204 of MMIO 202 through AHB 216 and then passed to CORDIC kernel 206 through signal paths 218, 220, and 222, respectively. Each calculation data set may also include a control input received through AHB 216 that sets a rotation/vectoring mode (ROT_VEC) and an operating mode (M) (linear/circular/hyperbolic), which control CORDIC kernel 206 through signal paths 224 and 226, respectively, to execute a selected calculation. In some examples, CORDIC 114 is configured to automatically begin a calculation in response to each of the X, Y, and Z parameters of a calculation data set being loaded into register space 204. With the selected calculation complete, the CORDIC kernel 206 passes the result data set to the register space 204. Each result data set may include an X result (X_OUT), a Y result (Y_OUT), and a Z result (Z_OUT) that is passed to the register space 204 through signal paths 218, 220, and 222, respectively.

Typical CORDICs may not include a start calculation trigger. Thus, in typical CORDICs, the next calculation data set cannot be loaded into the CORDIC until the end calculation trigger is received or the CORDIC is polled to determine that the calculation has started. In contrast, the CORDIC 114 disclosed herein includes a start calculation trigger to trigger the CPU 102 (FIGS. 1A and 1B) and/or the first DMA engine 110 to pre-load the next calculation data set into the CORDIC. By pre-loading the next calculation data set into the CORDIC 114 in response to the start calculation trigger, idle time is reduced compared to typical CORDICs.

FIG. 3 is a table illustrating one example of a CORDIC register space 204. The CORDIC register space 204 includes an address offset, a quantity, a width, and a name for each register. The CORDIC register space 204 includes an identifier (ID) register 302 that uniquely identifies the CORDIC. The CORDIC register space 204 includes a plurality of interrupt configuration registers including a interrupt (INTR) register 304, an interrupt set (INTR_SET) register 306, an interrupt mask (INTR_MASK) register 308, and an interrupt masked (INTR_MASKED) register 310. The CORDIC register space 204 includes a result of the previous calculation (KEEP) register 312. The CORDIC register space 204 includes a control (CON) register 314 that includes an option to automatically start a calculation after writing to a particular register. The CORDIC register space 204 includes calculation data set registers including an X parameter (CORDX) register 316, a Y parameter (CORDY) register 318, and a Z parameter (CORDZ) register 320. The CORDIC register space 204 includes result data set registers including an X result (CORRX) register 322, a Y result (CORRY) register 324, and a Z result (CORRZ) register 326. The CORDIC register space 204 includes a status (STAT) register 328 that identifies the status of the CORDIC (e.g., calculating or done). The CORDIC register space 204 includes a start command (START_CMD) register 330, which may be used to manually start a calculation if the auto-start functionality is disabled (e.g., via the CON register 314).

Each of the registers 302-330 has a quantity of one and a width of 32 bits. The registers 302-330 include addresses in ascending order as indicated by the address offsets. As illustrated in the table, the plurality of registers of the CORDIC register space 204 include, in order, a control register 314 to define a calculation to be performed by the CORDIC, an X parameters register 316, a Y parameter register 318, and a z parameter register 320. In addition, the plurality of registers include, immediately following the z parameter register 320 and in order, an X result register 322, a Y result register 324, and a Z result register 326. In this way, the CORDIC register space 204 is DMA friendly.

In typical CORDICs, an auto-start feature may be implemented to automatically start a calculation after writing into the X parameter register 316 leading to inefficiencies (e.g., by not covering all possible scenarios, since in typical use cases four registers, i.e., control register 314, X parameter register 316, Y parameter register 318, and Z parameter register 320, need to be programmed). In comparison, the auto-start functionality disclosed herein is flexible such that a calculation may be automatically started after any selected one of the three data registers, i.e., X parameter register 316, Y parameter register 318, and Z parameter register 320, is written. In one example, the auto-start functionality is set to automatically start a calculation after writing the Z parameter register 320.

Figure 4A:
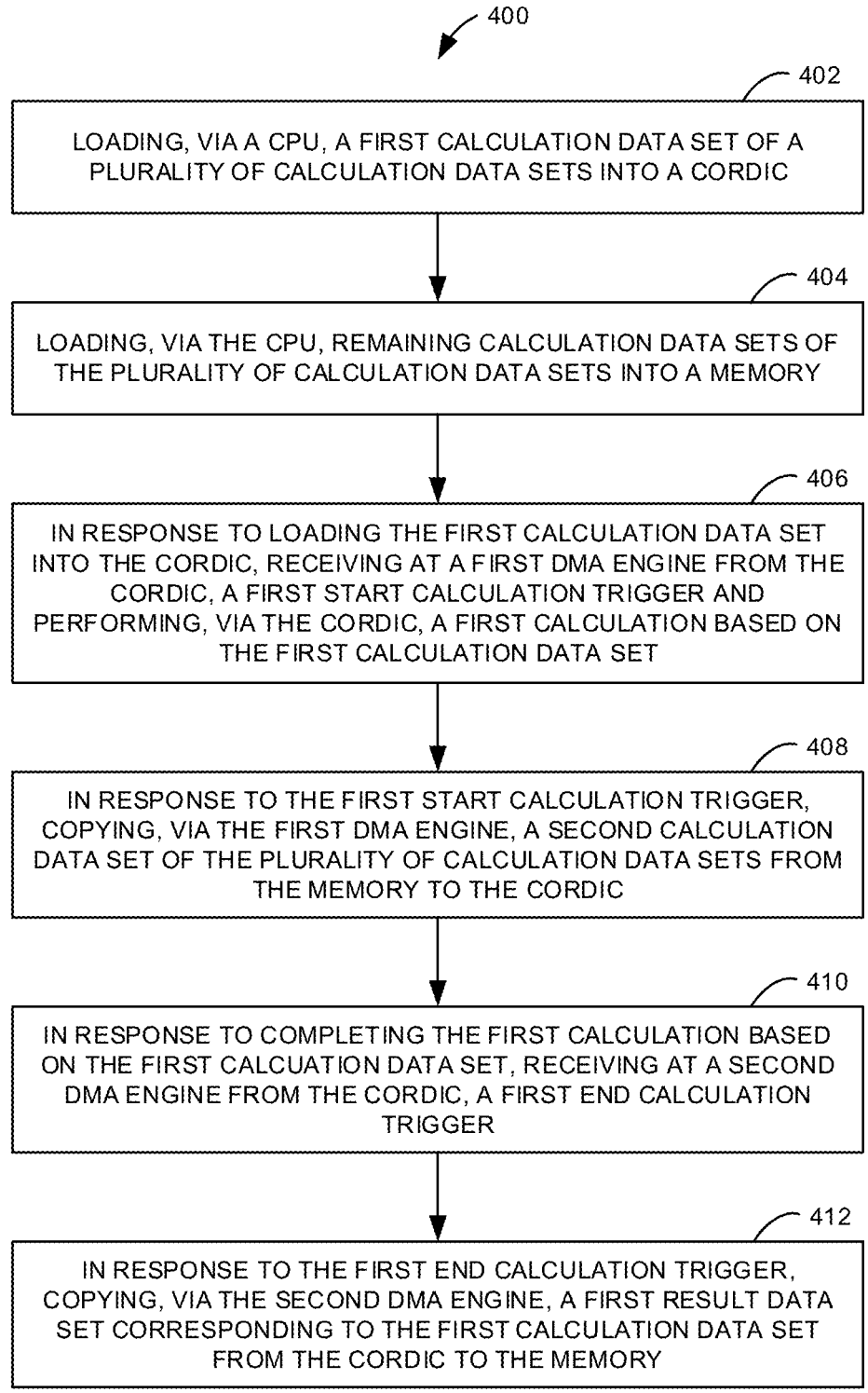
FIGS. 4A-4D are flow diagrams illustrating one example method for executing a plurality of calculations on a CORDIC.

FIGS. 4A-4D are flow diagrams illustrating one example method 400 for executing a plurality of calculations on a CORDIC. In some examples, method 400 may be implemented by device 100a or 100b previously described and illustrated with reference to FIGS. 1A and 1B. As illustrated in FIG. 4A at 402, method 400 includes loading (e.g., via 120), via a CPU (e.g., 102), a first calculation data set of a plurality of calculation data sets into a CORDIC (e.g., 114). At 404, method 400 includes loading (e.g., via 122), via the CPU, remaining calculation data sets of the plurality of calculation data sets into a memory (e.g., 104). At 406, method 400 includes in response to loading the first calculation data set into the CORDIC, receiving at a first Direct Memory Access (DMA) engine (e.g., 110) from the CORDIC, a first start calculation trigger (e.g., via 128) and performing, via the CORDIC, a first calculation based on the first calculation data set. At 408, method 400 includes in response to the first start calculation trigger, copying, via the first DMA engine, a second calculation data set of the plurality of calculation data sets from the memory to the CORDIC (e.g., via 124 and 126). In some examples, copying, via the first DMA engine, the second calculation data set of the plurality of calculation data sets from the memory to the CORDIC includes copying, via the first DMA engine, the second calculation data set of the plurality of calculation data sets from the memory into four input registers (e.g., 314, 316, 318, 320 of FIG. 3) of the CORDIC including addresses in ascending order.

At 410, method 400 includes in response to completing the first calculation based on the first calculation data set, receiving at a second DMA engine (e.g., 112) from the CORDIC, a first end calculation trigger (e.g., via 130). At 412, method 400 includes in response to the first end calculation trigger, copying, via the second DMA engine, a first result data set corresponding to the first calculation data set from the CORDIC to the memory (e.g., via 132 and 134). In some examples, copying, via the second DMA engine, the first result data set corresponding to the first calculation data set from the CORDIC to the memory includes copying, via the second DMA engine, the first result data set corresponding to the first calculation data set from three output registers (e.g., 322, 324, 326 of FIG. 3) of the CORDIC including addresses in ascending order to the memory.

Figure 4B:
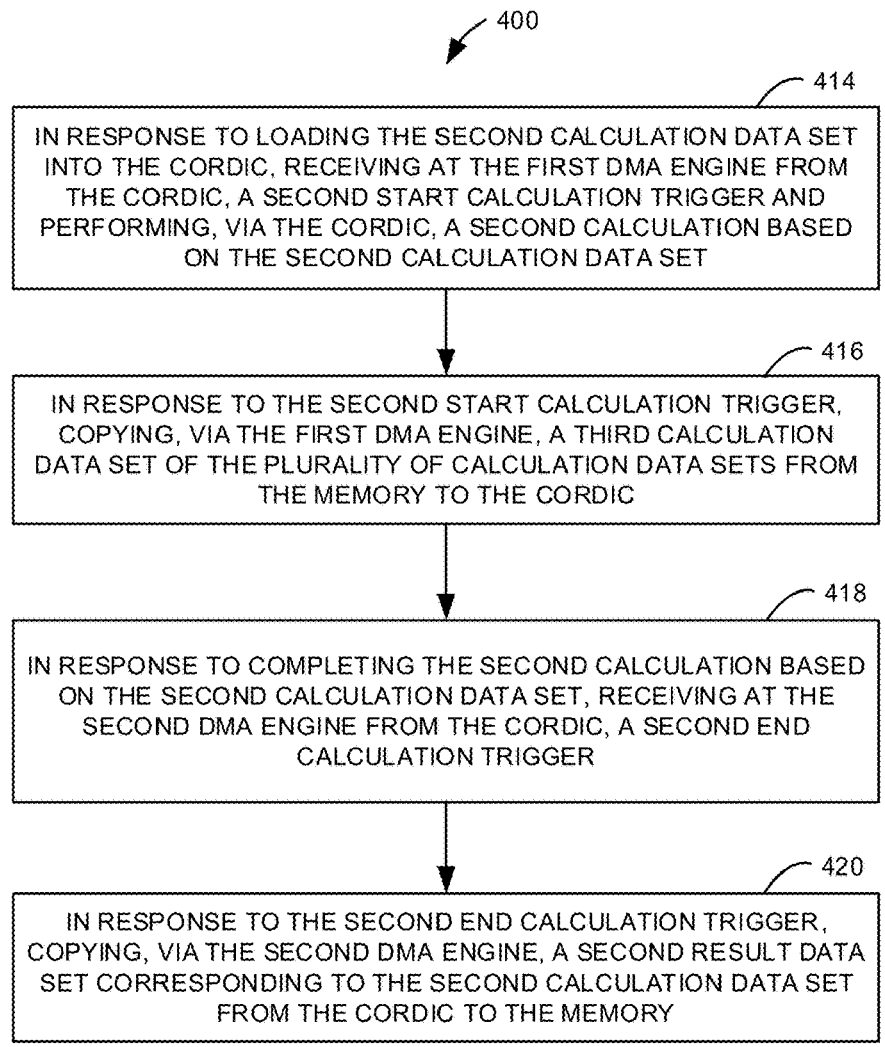

As illustrated in FIG. 4B at 414, method 400 may further include in response to loading the second calculation data set into the CORDIC, receiving at the first DMA engine from the CORDIC, a second start calculation trigger (e.g., via 128) and performing, via the CORDIC, a second calculation based on the second calculation data set. At 416, method 400 may further include in response to the second start calculation trigger, copying, via the first DMA engine, a third calculation data set of the plurality of calculation data sets from the memory to the CORDIC. At 418, method 400 may further include in response to completing the second calculation based on the second calculation data set, receiving at the second DMA engine from the CORDIC, a second end calculation trigger (e.g., via 130). At 420, method 400 may further include in response to the second end calculation trigger, copying, via the second DMA engine, a second result data set corresponding to the second calculation data set from the CORDIC to the memory. The above method may be repeated until each calculation data set has been processed by the CORDIC to calculate a corresponding result data set.

Figure 4C:
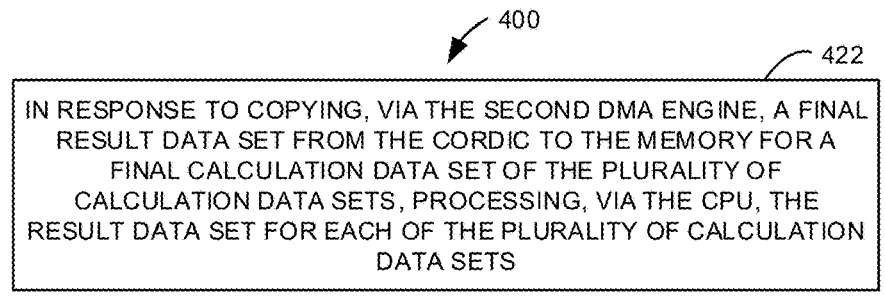
Figure 4D:
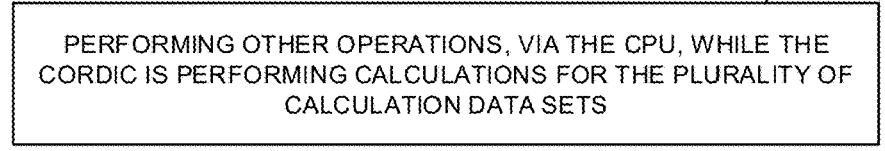

As illustrated in FIG. 4C at 422, method 400 may further include in response to copying, via the second DMA engine, a final result data set from the CORDIC to the memory for a final calculation data set of the plurality of calculation data sets, processing, via the CPU, the result data set for each of the plurality of calculation data sets (e.g., via 138). As illustrated in FIG. 4D at 424, method 400 may further include performing other operations, via the CPU, while the CORDIC is performing calculations for the plurality of calculation data sets.

It is to be understood that the features of the various exemplary embodiments described herein may be combined with each other, unless specifically noted otherwise.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A device comprising:
a Coordinate Rotation Digital Computer (CORDIC);
a memory to store an array of calculation data sets and an array of result data sets corresponding to the calculation data sets;
a first Direct Memory Access (DMA) engine to copy each data set of the array of calculation data sets from the memory to the CORDIC; and
a second DMA engine to copy each result data set of the array of result data sets from the CORDIC to the memory and to generate a trigger in response to copying a final result data set of the array of result data sets to the memory.

2. The device of claim 1, wherein the CORDIC comprises a start calculation trigger connected to the first DMA engine to initiate copying of a next calculation data set of the array of calculation data sets from the memory to the CORDIC.

3. The device of claim 1, wherein the CORDIC comprises an end calculation trigger connected to the second DMA engine to initiate copying of a current result data set of the array of result data sets from the CORDIC to the memory.

4. The device of claim 1, wherein the CORDIC comprises a register space comprising four input registers including addresses in ascending order to input a calculation data set to the CORDIC.

5. The device of claim 4, wherein the register space comprises three output registers including addresses in ascending order to output a result data set from the CORDIC.

6. The device of claim 1, further comprising:
a third DMA engine to copy each result data set of the array of result data sets from the memory to a peripheral.

7. A device comprising:
a Coordinate Rotation Digital Computer (CORDIC);
a memory; and
a Central Processing Unit (CPU) configured to perform a plurality of calculations on the CORDIC to provide a corresponding plurality of result data sets by:
loading a first calculation data set for the plurality of calculations into the CORDIC;
loading remaining calculation data sets for the plurality of calculations into the memory;
setting up a first Direct Memory Access (DMA) engine to copy each calculation data set from the memory to the CORDIC and a second DMA engine to copy each result data set from the CORDIC to the memory; and
receiving a trigger from the second DMA engine in response to the second DMA engine copying a final result data set for the plurality of calculations from the CORDIC to the memory.

8. The device of claim 7, wherein the CORDIC comprises a start calculation trigger connected to the first DMA engine to initiate copying of a next calculation data set for the plurality of calculations from the memory to the CORDIC.

9. The device of claim 7, wherein the CORDIC comprises an end calculation trigger connected to the second DMA engine to initiate copying of a current result data set for the plurality of calculations from the CORDIC to the memory.

10. The device of claim 7, wherein the CORDIC comprises a plurality of registers including addresses in ascending order.

11. The device of claim 10, wherein the plurality of registers comprises, in order, a control register to define a calculation to be performed by the CORDIC, an X parameter register, a Y parameter register, and a Z parameter register.

12. The device of claim 11, wherein the plurality of registers comprises, immediately following the Z parameter register and in order, an X result register, a Y result register, and a Z result register.

13. The device of claim 10, wherein each of the plurality of registers comprises a same width.

14. The device of claim 7, wherein the CPU is configured to perform other operations while the CORDIC is performing the plurality of calculations.

15. A method comprising:
loading, via a Central Processing Unit (CPU), a first calculation data set of a plurality of calculation data sets into a Coordinate Rotation Digital Computer (CORDIC);
loading, via the CPU, remaining calculation data sets of the plurality of calculation data sets into a memory;
in response to loading the first calculation data set into the CORDIC, receiving at a first Direct Memory Access (DMA) engine from the CORDIC, a first start calculation trigger and performing, via the CORDIC, a first calculation based on the first calculation data set;
in response to the first start calculation trigger, copying, via the first DMA engine, a second calculation data set of the plurality of calculation data sets from the memory to the CORDIC;
in response to completing the first calculation based on the first calculation data set, receiving at a second DMA engine from the CORDIC, a first end calculation trigger; and
in response to the first end calculation trigger, copying, via the second DMA engine, a first result data set corresponding to the first calculation data set from the CORDIC to the memory.

16. The method of claim 15, further comprising:
in response to loading the second calculation data set into the CORDIC, receiving at the first DMA engine from the CORDIC, a second start calculation trigger and performing, via the CORDIC, a second calculation based on the second calculation data set;
in response to the second start calculation trigger, copying, via the first DMA engine, a third calculation data set of the plurality of calculation data sets from the memory to the CORDIC;
in response to completing the second calculation based on the second calculation data set, receiving at the second DMA engine from the CORDIC, a second end calculation trigger; and
in response to the second end calculation trigger, copying, via the second DMA engine, a second result data set corresponding to the second calculation data set from the CORDIC to the memory.

17. The method of claim 16, further comprising:
in response to copying, via the second DMA engine, a final result data set from the CORDIC to the memory for a final calculation data set of the plurality of calculation data sets, processing, via the CPU, the result data set for each of the plurality of calculation data sets.

18. The method of claim 17, further comprising:
performing other operations, via the CPU, while the CORDIC is performing calculations for the plurality of calculation data sets.

19. The method of claim 15, wherein copying, via the first DMA engine, the second calculation data set of the plurality of calculation data sets from the memory to the CORDIC comprises copying, via the first DMA engine, the second calculation data set of the plurality of calculation data sets from the memory into four input registers of the CORDIC including addresses in ascending order.

20. The method of claim 15, wherein copying, via the second DMA engine, the first result data set corresponding to the first calculation data set from the CORDIC to the memory comprises copying, via the second DMA engine, the first result data set corresponding to the first calculation data set from three output registers of the CORDIC including addresses in ascending order to the memory.

* * * * *